US012645445B2

(12) United States Patent
Lakshmikanth et al.

(10) Patent No.: US 12,645,445 B2
(45) Date of Patent: Jun. 2, 2026

(54) UTILIZING LOCATION-BASED REPOSITORY MIRRORS FOR DEVICE UPGRADES

(71) Applicant: Juniper Networks, Inc., Sunnyvale, CA (US)

(72) Inventors: Harsha Lakshmikanth, Bangalore (IN); Khemendra Kumar, Bangalore (IN); Raghuram Malpe Pai, Santa Clara, CA (US); Yixiao Wei, Ottawa (CA)

(73) Assignee: Hewlett Packard Enterprise Development LP, Spring, TX (US)

( * ) Notice: Subject to any disclaimer, the term of this patent is extended or adjusted under 35 U.S.C. 154(b) by 207 days.

(21) Appl. No.: 18/394,130

(22) Filed: Dec. 22, 2023

(65) Prior Publication Data

US 2025/0208847 A1      Jun. 26, 2025

(51) Int. Cl.
| | |
|---|---|
| *G06F 9/44* | (2018.01) |
| *G06F 8/65* | (2018.01) |
| *H04W 4/02* | (2018.01) |

(52) U.S. Cl.
CPC ............... *G06F 8/65* (2013.01); *H04W 4/02* (2013.01)

(58) Field of Classification Search
CPC ........................................................ G06F 8/65
USPC ........................................................ 717/173
See application file for complete search history.

(56) References Cited

U.S. PATENT DOCUMENTS

| | | | | |
|---|---|---|---|---|
| 6,167,567 A * | 12/2000 | Chiles | ........................ | G06F 8/65 |
| | | | | 717/173 |
| 7,340,505 B2 * | 3/2008 | Lisiecki | ................ | G06F 16/957 |
| | | | | 709/227 |
| 11,089,083 B1 * | 8/2021 | Thomason | .......... | H04L 67/1038 |
| 2012/0290531 A1 * | 11/2012 | Kallakuri | ................ | G06F 16/27 |
| | | | | 707/610 |
| 2021/0042160 A1 * | 2/2021 | Alamouti | .............. | H04L 67/565 |
| 2023/0145054 A1 * | 5/2023 | VanBenschoten | .......................... | |
| | | | | G06F 16/2379 |
| | | | | 707/620 |
| 2023/0362056 A1 | 11/2023 | Lucas et al. | | |

FOREIGN PATENT DOCUMENTS

| | | | | |
|---|---|---|---|---|
| CN | 110535768 A | 12/2019 | | |
| WO | WO-2023006970 A1 * | 2/2023 | ......... | G06F 9/44505 |

OTHER PUBLICATIONS

Extended European Search Report for European Application No. EP24158893.8 dated Sep. 5, 2024, 8 pages.

* cited by examiner

*Primary Examiner* — Evral E Bodden
(74) *Attorney, Agent, or Firm* — Juniper Networks, Inc.

(57) ABSTRACT

A device may receive edge data identifying locations of a plurality of edge devices and other criteria associated with the plurality of edge devices, and may identify an upgrade for an edge device, of the plurality of edge devices, based on the other criteria of the edge data. The device may identify a location of a repository mirror for the upgrade based on a location of the edge device identified in the edge data, and may instruct the edge device to utilize the location of the repository mirror to receive the upgrade.

20 Claims, 11 Drawing Sheets

100 →

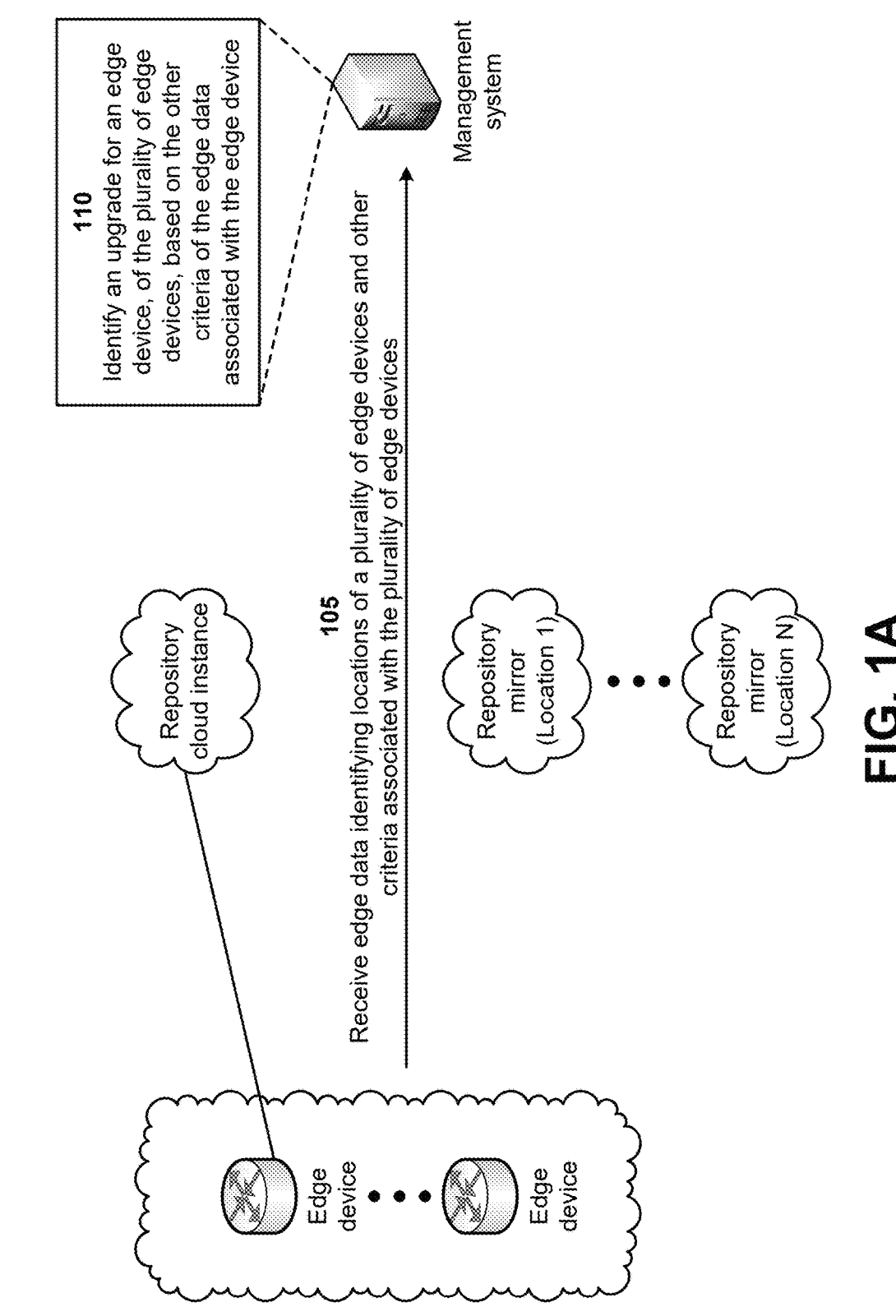

110

Identify an upgrade for an edge device, of the plurality of edge devices, based on the other criteria of the edge data associated with the edge device Management system Repository cloud instance

105

Receive edge data identifying locations of a plurality of edge devices and other criteria associated with the plurality of edge devices Repository mirror (Location 1)

Repository mirror (Location N)

Edge device

Edge device

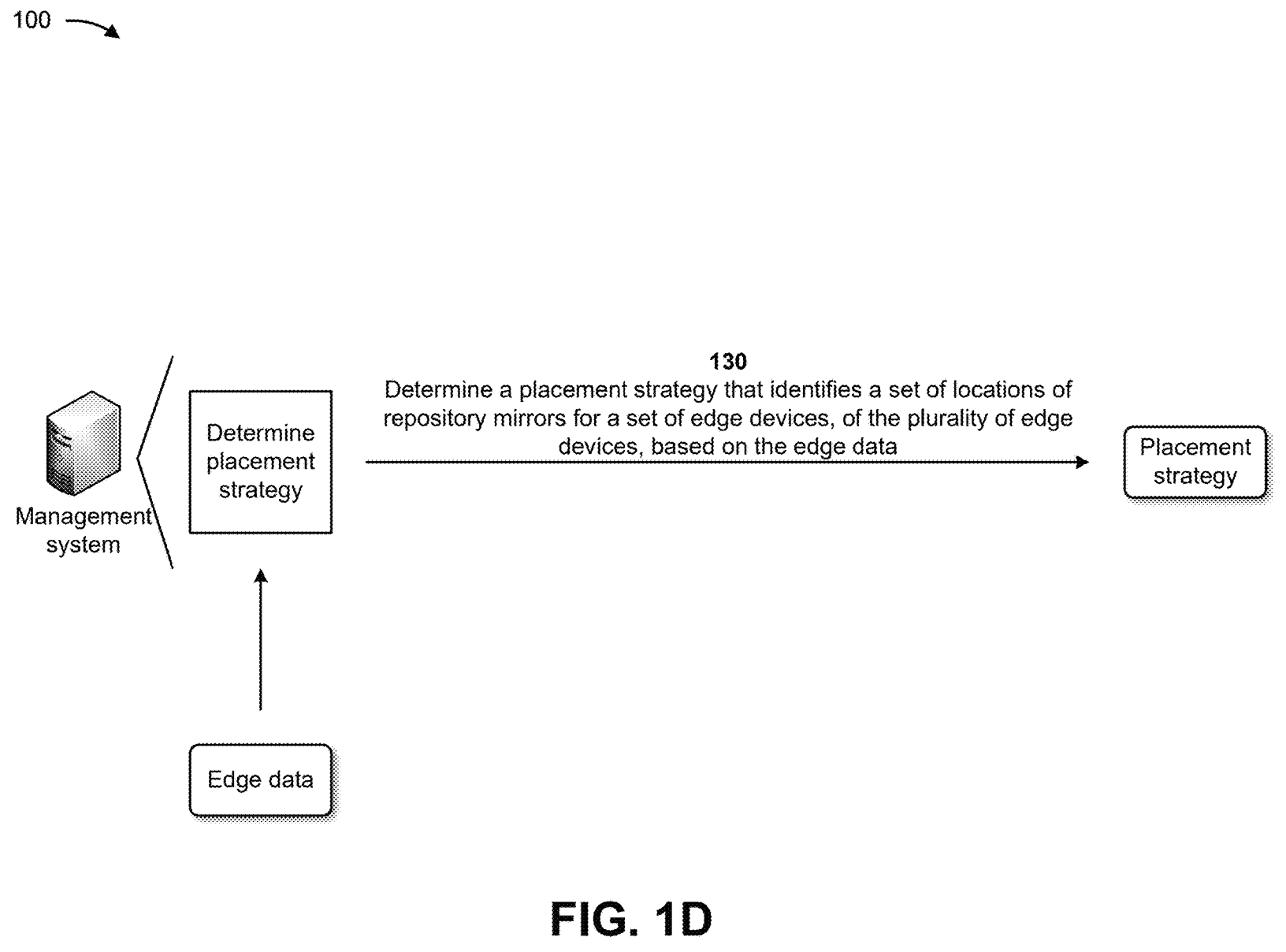

130
Determine a placement strategy that identifies a set of locations of repository mirrors for a set of edge devices, of the plurality of edge devices, based on the edge data Placement strategy Determine placement strategy Management system Edge data

FIG. 1D

135
Generate a minimal set of repository mirrors at the set of locations and remove unused repository mirrors based on the placement strategy Management system Repository cloud instance Repository mirror (Location 1)

Repository mirror (Location 2)

Repository mirror (Location N)

Edge device

Edge device

100

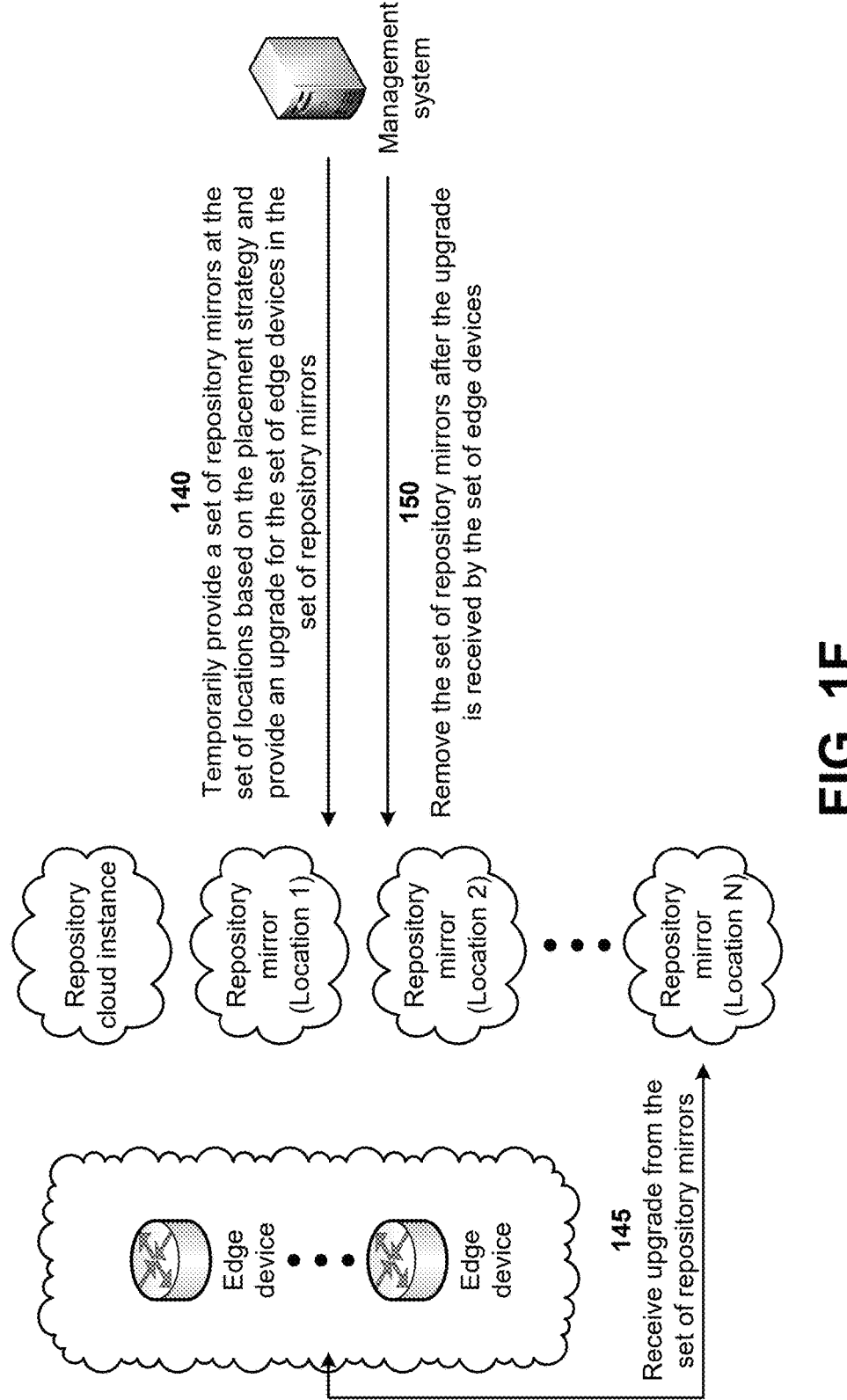

140
Temporarily provide a set of repository mirrors at the set of locations based on the placement strategy and provide an upgrade for the set of edge devices in the set of repository mirrors

150
Remove the set of repository mirrors after the upgrade is received by the set of edge devices Management system Repository cloud instance Repository mirror (Location 1)

Repository mirror (Location 2)

Repository mirror (Location N)

Edge device

Edge device

145
Receive upgrade from the set of repository mirrors

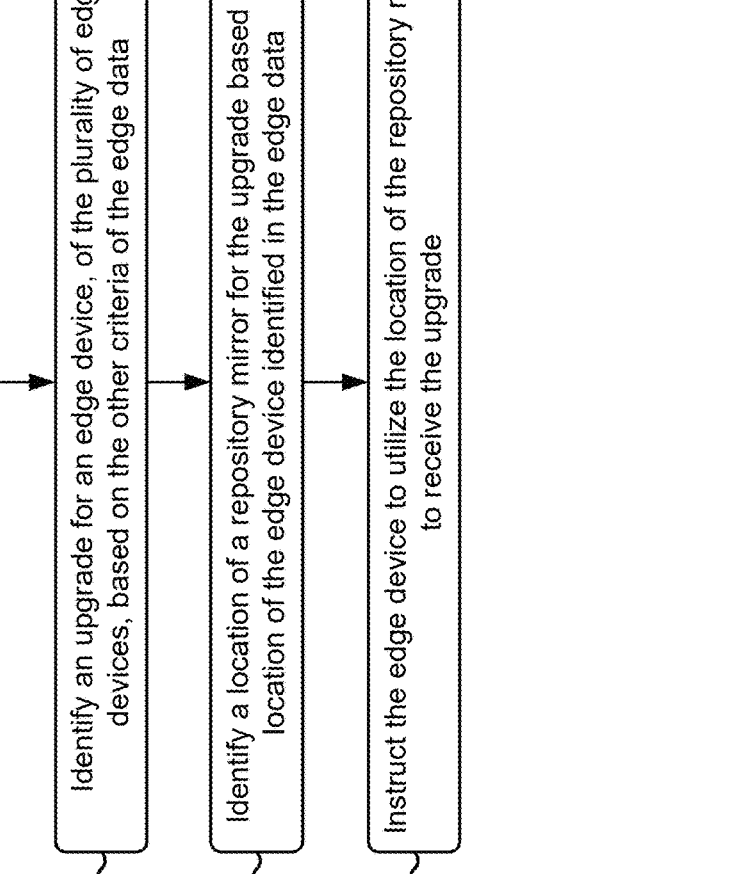

FIG. 5

510 — Receive edge data identifying locations of a plurality of edge devices and other criteria associated with the plurality of edge devices 520 — Identify an upgrade for an edge device, of the plurality of edge devices, based on the other criteria of the edge data 530 — Identify a location of a repository mirror for the upgrade based on a location of the edge device identified in the edge data 540 — Instruct the edge device to utilize the location of the repository mirror to receive the upgrade

500

UTILIZING LOCATION-BASED REPOSITORY MIRRORS FOR DEVICE UPGRADES

BACKGROUND

Cloud computing is the on-demand delivery of computing services, such as storage, software, analytics, and databases over the Internet to offer flexible resources and economies of scale.

SUMMARY

Some implementations described herein relate to a method. The method may include receiving edge data identifying locations of a plurality of edge devices and other criteria associated with the plurality of edge devices, and identifying an upgrade for an edge device, of the plurality of edge devices, based on the other criteria of the edge data. The method may include identifying a location of a repository mirror for the upgrade based on a location of the edge device identified in the edge data, and instructing the edge device to utilize the location of the repository mirror to receive the upgrade.

Some implementations described herein relate to a device. The device may include one or more memories and one or more processors. The one or more processors may be configured to receive edge data identifying locations of a plurality of edge devices and other criteria associated with the plurality of edge devices, and identify an upgrade for an edge device, of the plurality of edge devices, based on the other criteria of the edge data. The one or more processors may be configured to identify a location of a repository mirror for the upgrade based on a location of the edge device identified in the edge data, and instruct the edge device to utilize the location of the repository mirror to receive the upgrade. The one or more processors may be configured to remove the repository mirror after the upgrade is received by the edge device.

Some implementations described herein relate to a non-transitory computer-readable medium that stores a set of instructions. The set of instructions, when executed by one or more processors of a device, may cause the device to receive edge data identifying locations of a plurality of edge devices and other criteria associated with the plurality of edge devices, where the plurality of edge devices includes one or more thin client devices and one or more non-thin client devices. The set of instructions, when executed by one or more processors of the device, may cause the device to identify an upgrade for an edge device, of the plurality of edge devices, based on the other criteria of the edge data, and identify a location of a repository mirror for the upgrade based on a location of the edge device identified in the edge data. The set of instructions, when executed by one or more processors of the device, may cause the device to instruct the edge device to utilize the location of the repository mirror to receive the upgrade.

BRIEF DESCRIPTION OF THE DRAWINGS

FIGS. 1A-1G are diagrams of an example associated with utilizing location-based repository mirrors for device upgrades.

FIG. 5 is a flowchart of an example process for utilizing location-based repository mirrors for device upgrades.

DETAILED DESCRIPTION

Figure 1B:
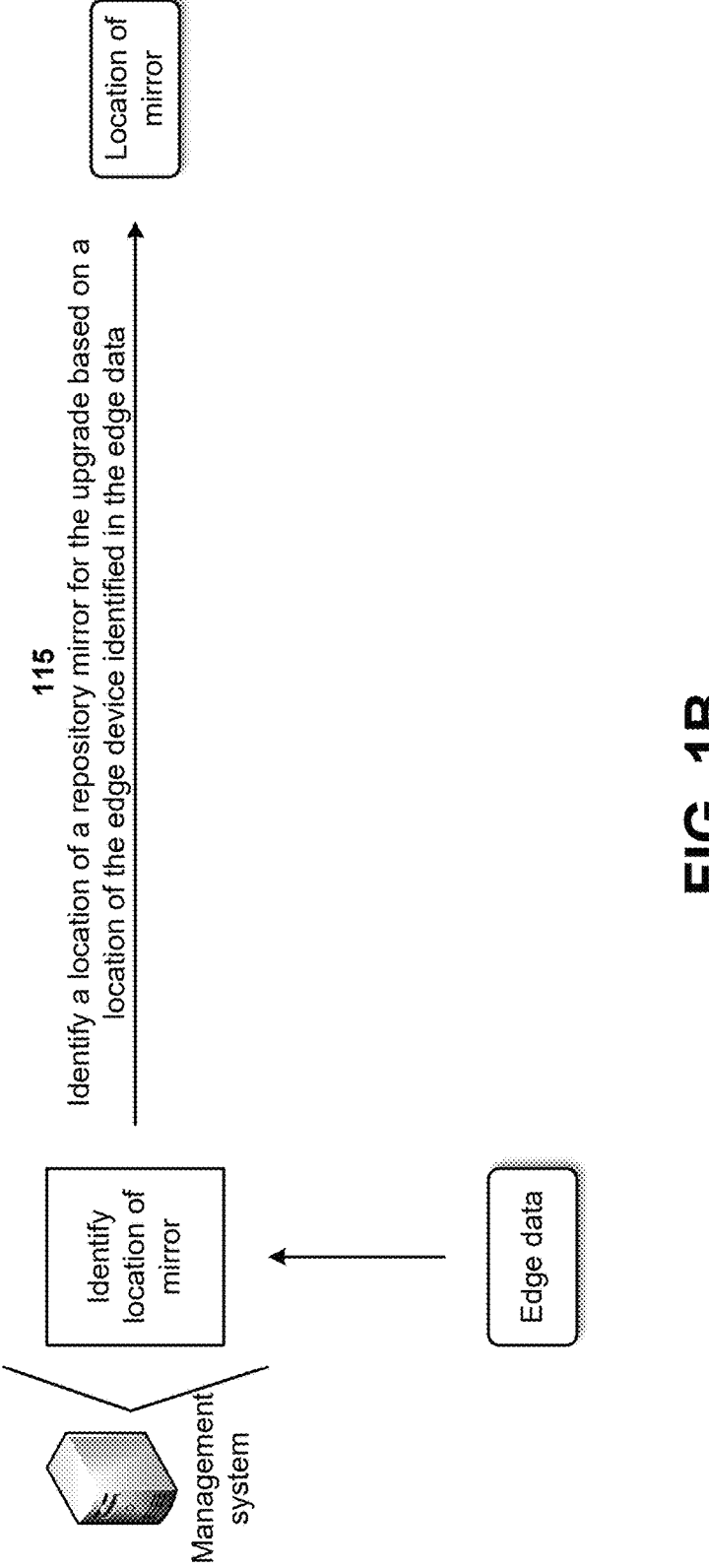

The following detailed description of example implementations refers to the accompanying drawings. The same reference numbers in different drawings may identify the same or similar elements.

A cloud-based platform may support several applications for customers. However, many customers are unwilling to connect devices directly to the cloud-based platform. Such customers may deploy edge devices on premises to connect to the cloud-based platform and act as a buffer between the customers' devices and the cloud-based platform. The edge devices may include thin clients (e.g., Internet of Things (IoT) devices) and/or non-thin clients (e.g., routers, switches, firewalls, wireless access points, and/or the like). Seamless onboarding, service deployment, lifecycle management, and monitoring is needed for the edge devices. Service deployment and upgrades are crucial parts of lifecycle management of the edge devices and also define a user experience. Upgrades of edge devices may be hosted and managed from the cloud-based platform (e.g., in repositories) at a single location or at a few locations. However, the edge devices may be located anywhere in the world. If the cloud-based platform and an edge device are located in the same area, a service deployment and an upgrade experience may be good. If the cloud-based platform and an edge device are located in different geographies, the service deployment and the upgrade experience may be very poor.

Thus, current techniques for supporting edge devices associated with a cloud-based platform consume computing resources (e.g., processing resources, memory resources, communication resources, and/or the like), networking resources, and/or the like, associated with providing poor service and upgrade experiences when the cloud-based platform and the edge devices are located in different geographies, experiencing performance issues with edge devices that are not appropriately upgraded, attempting to provide upgrades for the edge devices from non-secure sources creating security issues for customers of the edge devices upgraded from non-secure sources, and/or the like.

Some implementations described herein relate to a device (e.g., a management system) that utilizes location-based repository mirrors for device upgrades. For example, the management system may receive edge data identifying locations of a plurality of edge devices and other criteria associated with the plurality of edge devices, and may identify an upgrade for an edge device, of the plurality of edge devices, based on the other criteria of the edge data. The management system may identify a location of a repository mirror for the upgrade based on a location of the edge device identified in the edge data, and may instruct the edge device to utilize the location of the repository mirror to receive the upgrade. The management system may remove the repository mirror after the upgrade is received by the edge device.

In this way, the management system utilizes location-based repository mirrors for device upgrades. For example, the management system may receive edge data identifying locations of edge devices and other criteria associated with the edge devices, and may determine upgrades for the edge devices based on the other criteria. The management system may identify locations of repository mirrors to store the upgrades based on the locations of the edge devices, and may cause the repository mirrors to be instantiated at the locations. The edge devices may receive the upgrades from the repository mirrors and the management system may cause the repository mirrors to be removed from service after the upgrades are received by the edge devices. This may optimize cost and ensure a good user experience for edge device upgrades. Thus, the management system conserves computing resources, networking resources, and/or the like that would otherwise have been consumed by providing poor service and upgrade experiences when the cloud-based platform and the edge devices are located in different geographies, experiencing performance issues with edge devices that are not appropriately upgraded, attempting to provide upgrades for the edge devices from non-secure sources creating security issues for customers of the edge devices upgraded from non-secure sources, and/or the like.

FIGS. 1A-1G are diagrams of an example 100 associated with utilizing location-based repository mirrors for device upgrades. As shown in FIGS. 1A-1G, example 100 includes a plurality of edge devices associated with a management system. The management system may utilize a repository cloud instance and/or multiple repository mirrors to manage the plurality of edge devices. Each of the edge devices may include an edge network device, another managed device (e.g., an IoT device, a wireless access point, a router, a switch, a firewall, and/or the like), or any device whose lifecycle needs to be managed from a controller, a public cloud computing environment, or a private cloud computing environment. In some implementations, one or more edge devices may directly connect to a cloud computing environment. For example, a wireless access point may directly connect to a cloud computing environment, and the management system may manage an upgrade of the wireless access point in a same manner as the edge devices. Further details of the edge devices, the management system, the repository cloud instance, and the multiple repository mirrors are provided elsewhere herein.

As shown in FIG. 1A, and by reference number 105, the management system may receive edge data identifying locations of a plurality of edge devices and other criteria associated with the plurality of edge devices. For example, when the plurality of edge devices register with the management system, the plurality of edge devices may provide location data identifying the locations of the plurality of edge devices to the management system. Alternatively, or additionally, the plurality of edge devices may continuously or periodically generate geolocation data identifying the locations of the plurality of edge devices. The plurality of edge devices may provide the geolocation data identifying the locations of the plurality of edge devices to the management system. The management system may receive the location and/or the geolocation data from the plurality of edge devices.

In some implementations, a user or users may set the locations of the plurality of edge devices, or the management system may detect the locations of the plurality of edge devices. The management system may automatically detect the locations of the plurality of edge devices during registration of the plurality of edge devices and by establishing control channels with the plurality of edge devices (e.g., through which the locations of the plurality of edge devices may be obtained). If the management system is unable to determine an initial location of an edge device, the management system may assign a default location to the edge device. The management system may apply the other criteria on an ongoing basis (e.g., geolocation signals, round trip times, loads, connection stabilities, data privacy policies, and/or the like) to fine tune the locations of the plurality of edge devices.

In some implementations, the plurality of edge devices may generate other criteria associated with utilization of and connectivity to cloud services provided by the management system. For example, the other criteria may include round trip times associated with the plurality of edge devices (e.g., durations of network requests to travel from a starting point to a destination point and back again to the starting point). The other criteria may include connection stabilities associated with the plurality of edge devices, which provides an indication of loads on the plurality of edge devices (e.g., whether traffic is traveling from and to the plurality of edge devices at a regular speed). The other criteria may include upgrade success rates associated with the plurality of edge devices. For example, the plurality of edge devices may be periodically provided with upgrades and the success rates of the upgrades may be measured. The other criteria may include data privacy policies associated with the plurality of edge devices. For example, the data privacy policies may affect from which locations the plurality of edge devices may receive upgrades from the management system (e.g., to protect private information of customers). In some implementations, the other criteria may include one or more key performance indicators (KPIs) (e.g., throughput, latency, jitter, and/or the like) associated with the plurality of edge devices.

As further shown in FIG. 1A, and by reference number 110, the management system may identify an upgrade for an edge device, of the plurality of edge devices, based on the other criteria of the edge data associated with the edge device. For example, the management system may determine that a new upgrade for the edge device is available based on a type of the edge device (e.g., a new upgrade available for a particular type of router). In another example, the management system may provide periodic upgrades to the plurality of edge devices and may identify the upgrade for the edge device based on a schedule of periodic upgrades. In some implementations, if the other criteria indicate that a previous upgrade for the edge device was unsuccessful, the management system may identify the previous upgrade for the edge device. In some implementations, the management system may provide intelligent upgrades for the plurality of edge devices to ensure a high probability of success. In some implementations, the management system may identify the upgrade for the edge device based on the other criteria and to minimize timeout and retry possibilities. In some implementations, the management system may identify one or more underperforming KPIs associated with the edge device, and may identify an upgrade for the edge device that will improve the one or more underperforming KPIs.

As shown in FIG. 1B, and by reference number 115, the management system may identify a location of a repository mirror for the upgrade based on a location of the edge device identified in the edge data. For example, the management system may host repository mirrors at different locations (e.g., Location 1 through Location N) and may compare the location of the edge device and the different locations of the repository mirrors. The management system may identify a geographically closest location (e.g., of the different locations) to the location of the edge device based on comparing the location of the edge device and the different locations. In some implementations, the management system may utilize the location of the edge device as the location of the repository mirror and may cause a repository mirror to be instantiated at the location of the edge device (e.g., when a repository mirror is not already provided at the location). In some implementations, the management system may identify the location of the repository mirror for the upgrade based on the other criteria associated with the edge device. For example, if the other criteria indicate that a first location of the repository mirror will provide a better upgrade success rate than a second location of the repository mirror, the management system may utilize the first location of the repository mirror for the upgrade (e.g., even if the second location is closer to the location of the edge device than the first location).

Figure 1C:
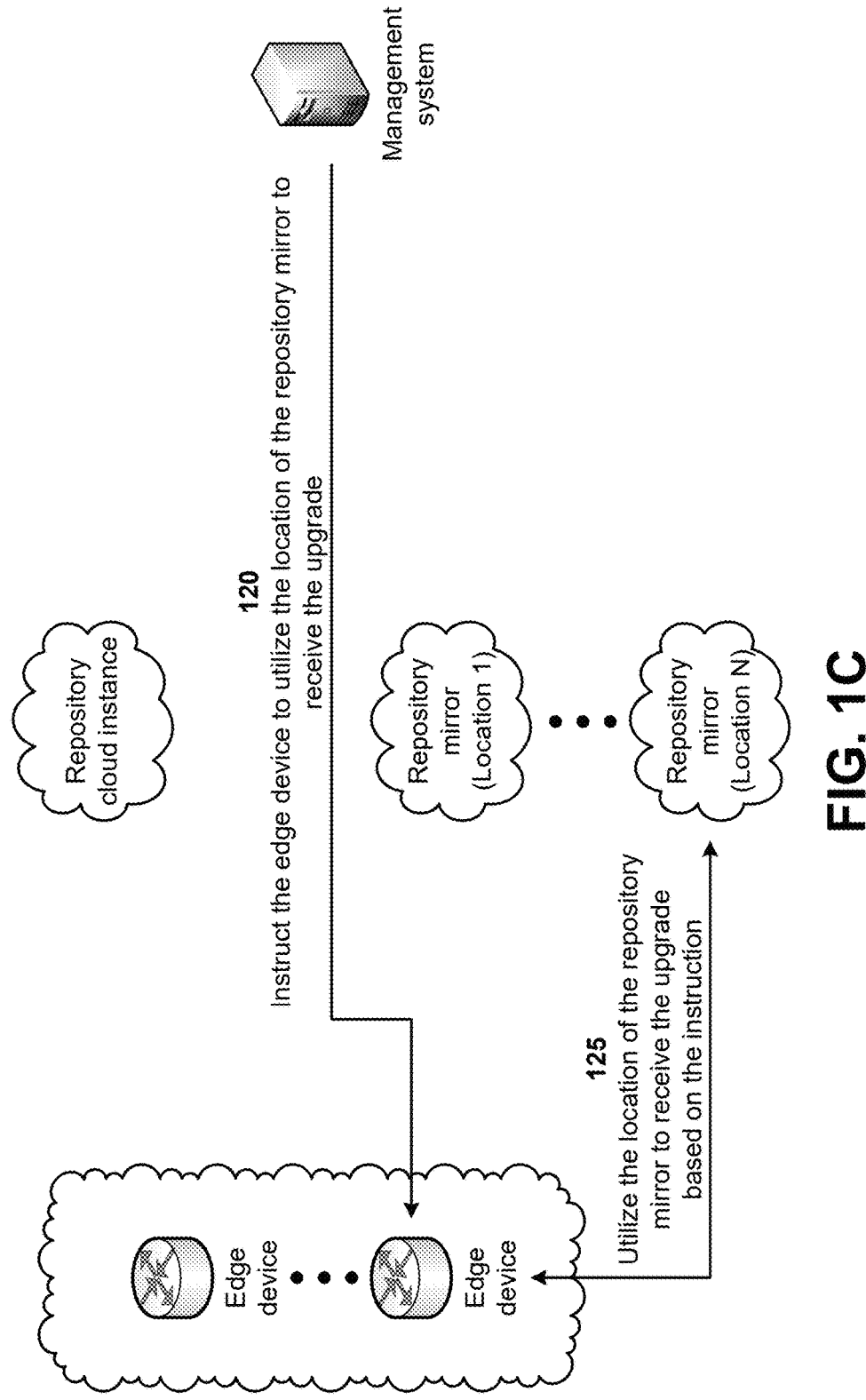

As shown in FIG. 1C, and by reference number 120, the management system may instruct the edge device to utilize the location of the repository mirror to receive the upgrade. For example, the management system may provide the upgrade to the repository mirror, and may generate an instruction that instructs the edge device to utilize the location of the repository mirror to receive the upgrade. The management system may provide the instruction, that instructs the edge device to utilize the location of the repository mirror to receive the upgrade, to the edge device, and the edge device may receive the instruction from the management system. In some implementations, the instruction may include additional information, such as a time period to utilize the location of the repository mirror to receive the upgrade (e.g., during nighttime hours), access information associated with the repository mirror, features associated with the upgrade (e.g., a region, a network address of the repository mirror, a token, and/or the like), and/or the like. In some implementations, the management system may utilize a secure control channel to provide the instruction to the edge device.

As further shown in FIG. 1C, and by reference number 125, the edge device may utilize the location of the repository mirror to receive the upgrade based on the instruction. For example, the edge device may utilize the instruction to access the repository mirror at the location (e.g., Location N) identified in the instruction. The edge device may provide a request for the upgrade to the repository mirror, and the repository mirror may provide the upgrade to the edge device based on the request. For example, the edge device may pull container images of the upgrade from the repository mirror and may monitor upgrade metrics during this process. The edge device may install the upgrade and may provide, to the management system, an indication that the upgrade has been successfully installed on the edge device and the upgrade metrics associated with the installation. In some implementations, the management system may utilize the upgrade metrics to modify the repository mirrors (e.g., provision new repository mirrors, remove existing repository mirrors, adjust locations of existing repository mirrors, and/or the like), provide a modified list of available repository mirrors for future upgrades, and/or the like.

As shown in FIG. 1D, and by reference number 130, the management system may determine a placement strategy that identifies a set of locations of repository mirrors for a set of edge devices, of the plurality of edge devices, based on the edge data. For example, the management system may support a set of edge devices (e.g., a set of thin clients), and may perform spatial rebalancing of repository mirrors to determine an optimal placement strategy of the repository mirrors for the set of thin clients. In some implementations, the management system may periodically execute a job that determines the optimal placement strategy of the repository mirrors for the set of deployed thin clients based on the edge data. The placement strategy may identify the set of locations of the repository mirrors for the set of edge devices (e.g., the set of thin clients) of the plurality of edge devices.

Figure 1E:
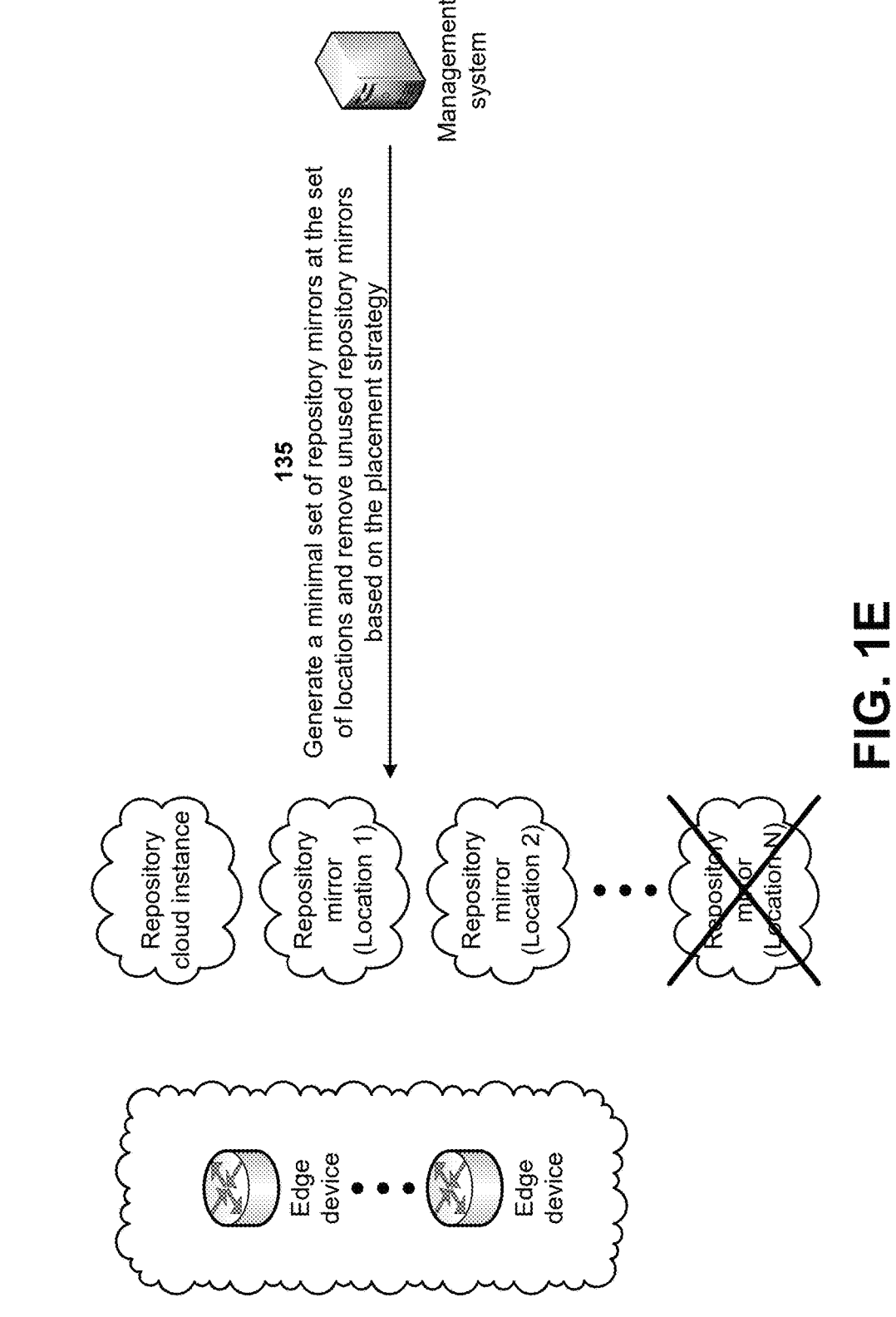

As shown in FIG. 1E, and by reference number 135, the management system may generate a minimal set of repository mirrors at the set of locations and remove unused repository mirrors based on the placement strategy. For example, the placement strategy may identify the minimal set of repository mirrors at the set of locations needed to support the set of edge devices (e.g., the set of thin clients). Based on the placement strategy, the management system may redistribute the minimal set of repository mirrors for the set of edge devices and may remove the unused repository mirrors (e.g., the repository mirrors not included in the minimal set of repository mirrors). In this way, the management system may maintain a minimum required set of repository mirrors for the set of thin clients, may satisfy upgrade KPIs of the set of thin clients, and may control costs associated with utilizing repository mirrors.

As shown in FIG. 1F, and by reference number 140, the management system may temporarily provide a set of repository mirrors at the set of locations based on the placement strategy and provide an upgrade for the set of edge devices in the set of repository mirrors. For example, when the set of edge devices is a set of non-thin clients, the management system may temporarily provide the set of repository mirrors at the set of locations based on the placement strategy. The management system may identify an upgrade for the set of non-thin clients based on the edge data, and may provision the set of repository mirrors with the upgrade identified for the set of non-thin clients. In some implementations, to further reduce costs, the management system may utilize ephemeral workloads and just-in-time provisioning of the set of repository mirrors when providing the upgrade for the set of non-thin-clients in the set of repository mirrors.

As further shown in FIG. 1F, and by reference number 145, the set of edge devices may receive the upgrade from the set of repository mirrors. For example, the set of edge devices may receive, from the management system, instructions to utilize the set of repository mirrors to receive the upgrade. The set of edge devices may utilize the instructions to access the set of repository mirrors at the set of locations identified in the instructions. The set of edge devices may provide requests for the upgrade to the set of repository mirrors, and the set of repository mirrors may provide the upgrade to the set of edge devices based on the requests. For example, the set of edge devices may pull container images of the upgrade from the set of repository mirrors and may monitor upgrade metrics during this process. The set of edge devices may install the upgrade and may provide, to the management system, indications that the upgrade has been successfully installed on the set of edge devices and the upgrade metrics associated with the installation. In some implementations, the management system may utilize the upgrade metrics to modify the set of repository mirrors (e.g., provision new repository mirrors, remove existing repository mirrors, adjust locations of existing repository mirrors, and/or the like), provide a modified list of available repository mirrors for future upgrades, and/or the like.

As further shown in FIG. 1F, and by reference number 150, the management system may remove the set of repository mirrors after the upgrade is received by the set of edge devices. For example, after the management system receives the indications that the upgrade has been successfully installed on the set of edge devices, the management system may remove the set of repository mirrors. In some implementations, when the set of edge devices are executing a specific upgrade and do not require additional upgrades, the management system may cause the set of repository mirrors to be removed (e.g., spun down). In some implementations, the management system may utilize an automatic upgrade schedule, and an opt-in to the schedule by the set of edge devices, when providing the upgrade to the set of repository mirrors, updating the set of edge devices with the upgrade, and removing the set of repository mirrors when the update is complete.

Figure 1G:
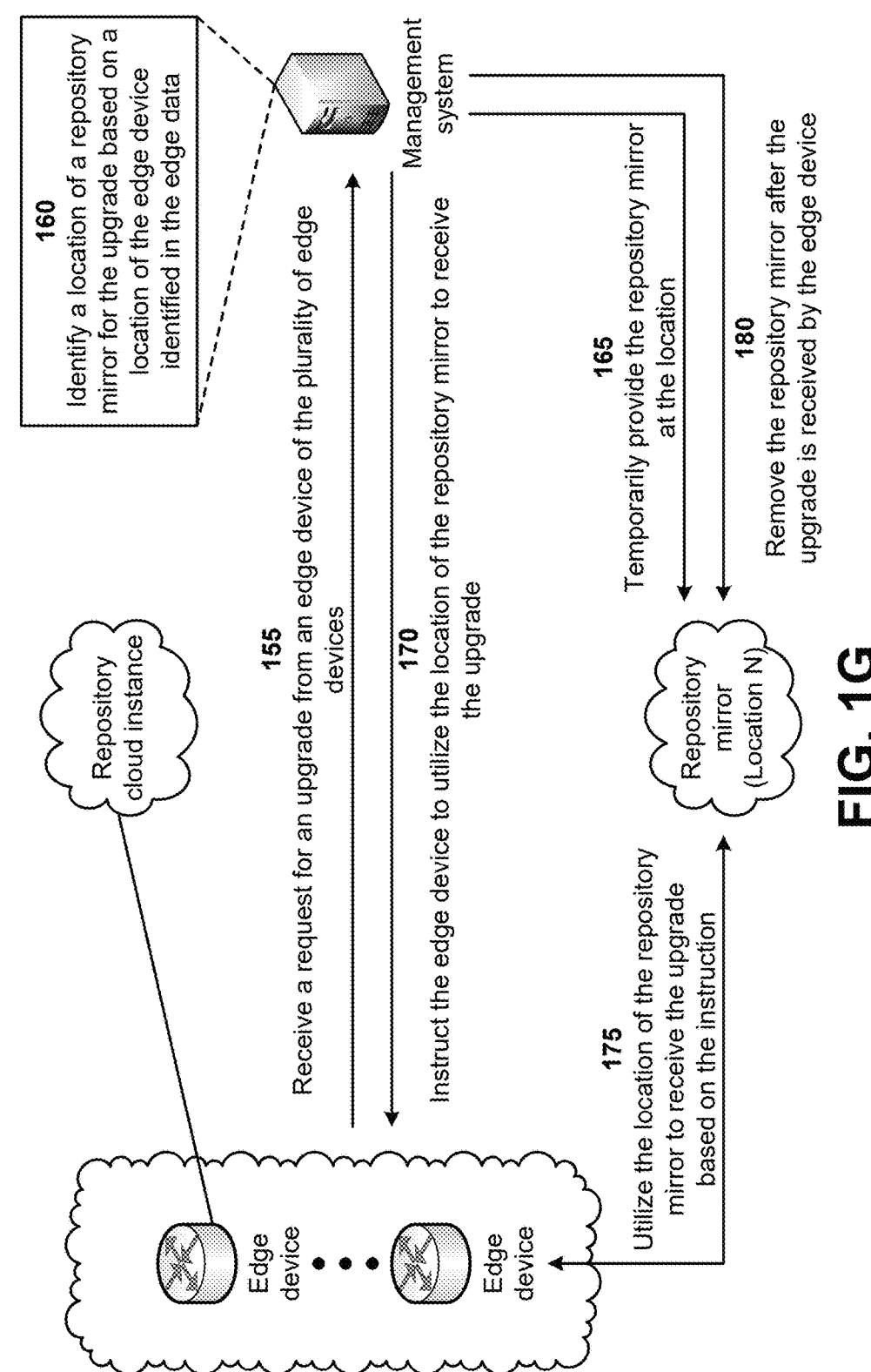

As shown in FIG. 1G, and by reference number 155, the management system may receive a request for an upgrade from an edge device of the plurality of edge devices. For example, for manual upgrades, a customer associated with an edge device, of the plurality of edge devices, may cause the edge device to generate the request for the upgrade. The edge device may provide the request for the upgrade to the management system, and the management system may receive the request for the upgrade from the edge device.

As further shown in FIG. 1G, and by reference number 160, the management system may identify a location of a repository mirror for the upgrade based on a location of the edge device identified in the edge data. For example, the management system may host repository mirrors at different locations (e.g., Location 1 through Location N) and may compare the location of the edge device and the different locations of the repository mirrors. The management system may identify a geographically closest location (e.g., of the different locations) to the location of the edge device based on comparing the location of the edge device and the different locations. In some implementations, the management system may utilize the location of the edge device as the location (e.g., Location N) of the repository mirror and may cause a repository mirror to be instantiated at the location of the edge device (e.g., when a repository mirror is not already provided at the location). In some implementations, the management system may identify the location of the repository mirror for the upgrade based on the other criteria associated with the edge device.

As further shown in FIG. 1G, and by reference number 165, the management system may temporarily provide the repository mirror at the location. For example, the management system may temporarily provide the repository mirror at the location based on the request for the upgrade. The management system may provision the repository mirror with the requested upgrade. In some implementations, to further reduce costs, the management system may utilize ephemeral workloads and just-in-time provisioning of the repository mirror when providing the requested upgrade for the set edge device in the repository mirror.

As further shown in FIG. 1G, and by reference number 170, the management system may instruct the edge device to utilize the location of the repository mirror to receive the upgrade. For example, the management system may generate an instruction that instructs the edge device to utilize the location of the repository mirror to receive the requested upgrade. The management system may provide the instruction, that instructs the edge device to utilize the location of the repository mirror to receive the requested upgrade, to the edge device, and the edge device may receive the instruction from the management system. In some implementations, the instruction may include additional information, such as a time period in which to utilize the location of the repository mirror to receive the upgrade (e.g., during nighttime hours), access information associated with the repository mirror, features associated with the upgrade (e.g., a region, a network address of the repository mirror, a token, and/or the like), and/or the like. In some implementations, the management system may utilize a secure control channel to provide the instruction to the edge device.

As further shown in FIG. 1G, and by reference number 175, the edge device may utilize the location of the repository mirror to receive the upgrade based on the instruction. For example, the edge device may utilize the instruction to access the repository mirror at the location (e.g., Location N) identified in the instruction. The edge device may provide a request for the upgrade to the repository mirror, and the repository mirror may provide the upgrade to the edge device based on the request. For example, the edge device may pull container images of the upgrade from the repository mirror and may monitor upgrade metrics during this process. The edge device may install the upgrade and may provide, to the management system, an indication that the upgrade has been successfully installed on the edge device and the upgrade metrics associated with the installation. In some implementations, the management system may utilize the upgrade metrics to modify the repository mirrors (e.g., provision new repository mirrors, remove existing repository mirrors, adjust locations of existing repository mirrors, and/or the like), provide a modified list of available repository mirrors for future upgrades, and/or the like.

As further shown in FIG. 1G, and by reference number 180, the management system may remove the repository mirror after the upgrade is received by the edge device. For example, after the management system receives the indication that the upgrade has been successfully installed on the edge device, the management system may remove the repository mirror. In some implementations, when the edge device is executing the upgrade and does not require additional upgrades, the management system may cause the set of repository mirrors to be removed (e.g., spun down).

In this way, the management system utilizes location-based repository mirrors for device upgrades. For example, the management system may receive edge data identifying locations of edge devices and other criteria associated with the edge devices, and may determine upgrades for the edge devices based on the other criteria. The management system may identify locations of repository mirrors to store the upgrades based on the locations of the edge devices, and may cause the repository mirrors to be instantiated at the locations. The edge devices may receive the upgrades from the repository mirrors and the management system may cause the repository mirrors to be removed from service after the upgrades are received by the edge devices. This may optimize cost and ensure a good user experience for edge device upgrades. Thus, the management system conserves computing resources, networking resources, and/or the like that would otherwise have been consumed by providing poor service and upgrade experiences when the cloud-based platform and the edge devices are located in different geographies, experiencing performance issues with edge devices that are not appropriately upgraded, attempting to provide upgrades for the edge devices from non-secure sources creating security issues for customers of the edge devices upgraded from non-secure sources, and/or the like.

Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices)

shown in FIGS. 1A-1G may perform one or more functions described as being performed by another set of devices shown in FIGS. 1A-1G.

Figure 2:
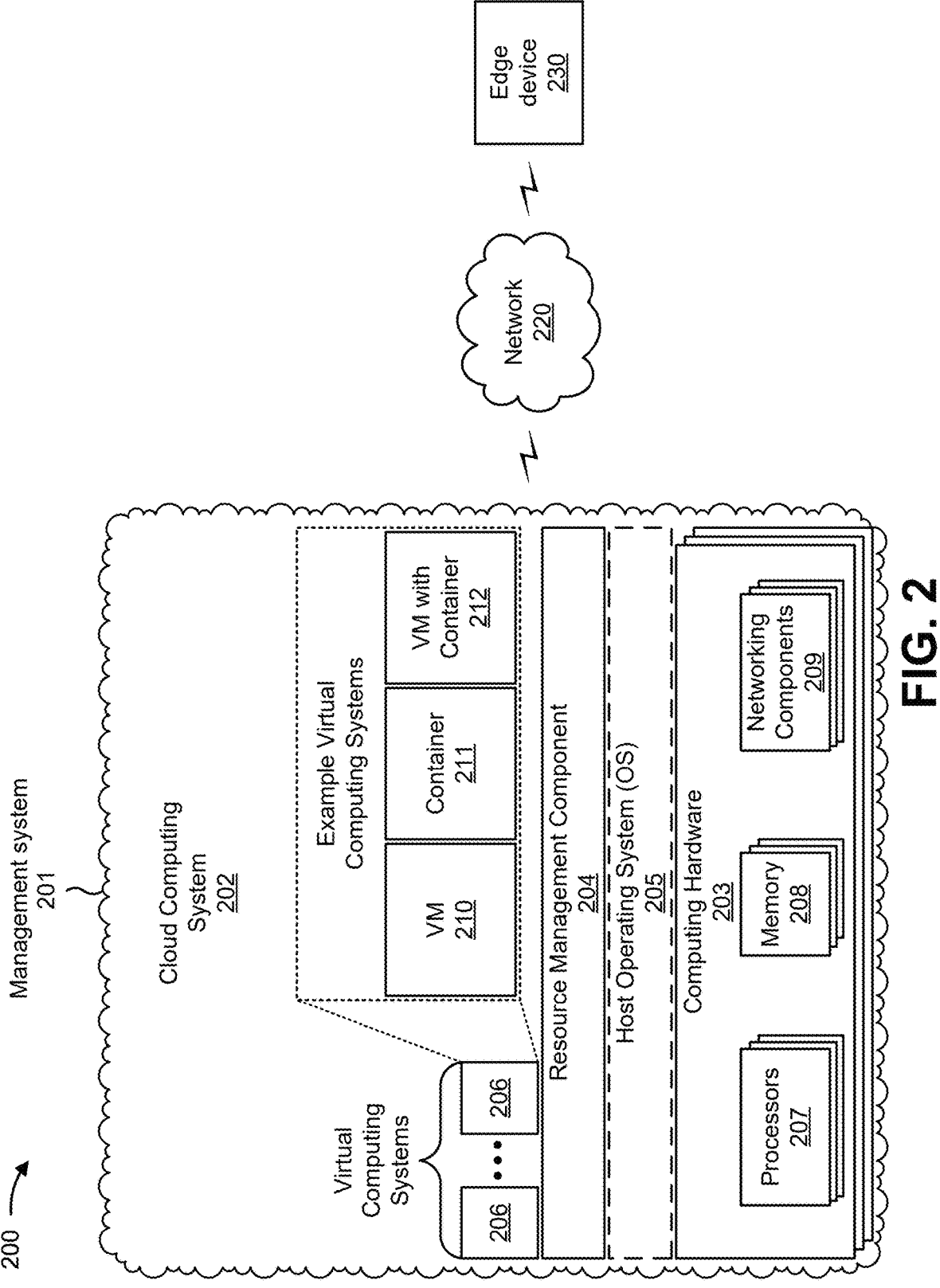
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include a management system 201, which may include one or more elements of and/or may execute within a cloud computing system 202. The cloud computing system 202 may include one or more elements 203-212, as described in more detail below. As further shown in FIG. 2, the environment 200 may include a network 220 and/or an edge device 230. Devices and/or elements of the environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as the computing hardware 203) capable of virtualizing the computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using the computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the management system 201 may include one or more elements 203-212 of the cloud computing system 202, may execute within the cloud computing system 202, and/or may be hosted within the cloud computing system 202, in some implementations, the management system 201 may not be cloud-based (e.g., may be implemented outside of a cloud computing system) or may be partially cloud-based. For example, the management system 201 may include one or more devices that are not part of the cloud computing system 202, such as a device 300 of FIG. 3 or a device 400 of FIG. 4, which may include a standalone server or another type of computing device. The management system 201 may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The edge device 230 may include one or more devices capable of receiving, generating, storing, processing, and/or providing information, as described elsewhere herein. The edge device 230 may include a communication device and/or a computing device. For example, the edge device 230 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), an Internet of Things (IoT) device, or a similar type of device.

The edge device 230 may include one or more devices capable of receiving, processing, storing, routing, and/or providing traffic (e.g., a packet and/or other information or metadata) in a manner described herein. For example, the edge device 230 may include a router, such as a label switching router (LSR), a label edge router (LER), an ingress router, an egress router, a provider router (e.g., a provider edge router or a provider core router), a virtual router, or another type of router. Additionally, or alternatively, the edge device 230 may include a gateway, a switch, a firewall, a hub, a bridge, a reverse proxy, a server (e.g., a proxy server, a cloud server, or a data center server), a load balancer, and/or a similar device. In some implementations, the edge device 230 may be a physical device implemented within a housing, such as a chassis. In some implementations, the edge device 230 may be a virtual device implemented by one or more computing devices of a cloud computing environment or a data center. In some implementations, a group of edge devices 230 may be a group of data center nodes that are used to route traffic flow through a network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
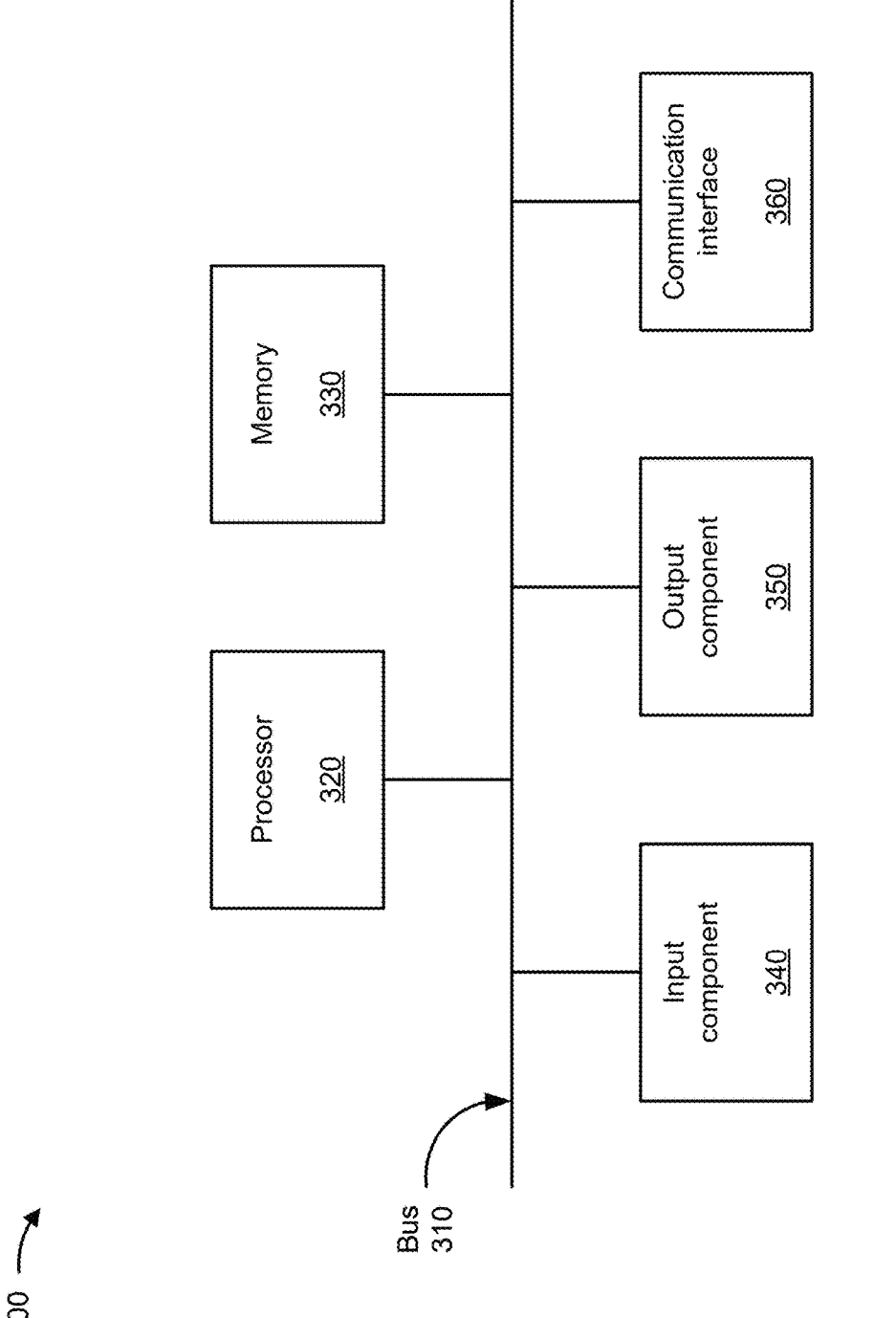
FIGS. 3 and 4 are diagrams of example components of one or more devices of FIG. 2.

FIG. 3 is a diagram of example components of one or more devices of FIG. 2. The example components may be included in a device 300, which may correspond to the management system 201 and/or the edge device 230. In some implementations, the management system 201, the edge device 230, and/or the edge device 230 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit (CPU), a graphics processing unit (GPU), a microprocessor, a controller, a microcontroller, a digital signal processor (DSP), a field-programmable gate array (FPGA), an application-specific integrated circuit (ASIC), and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
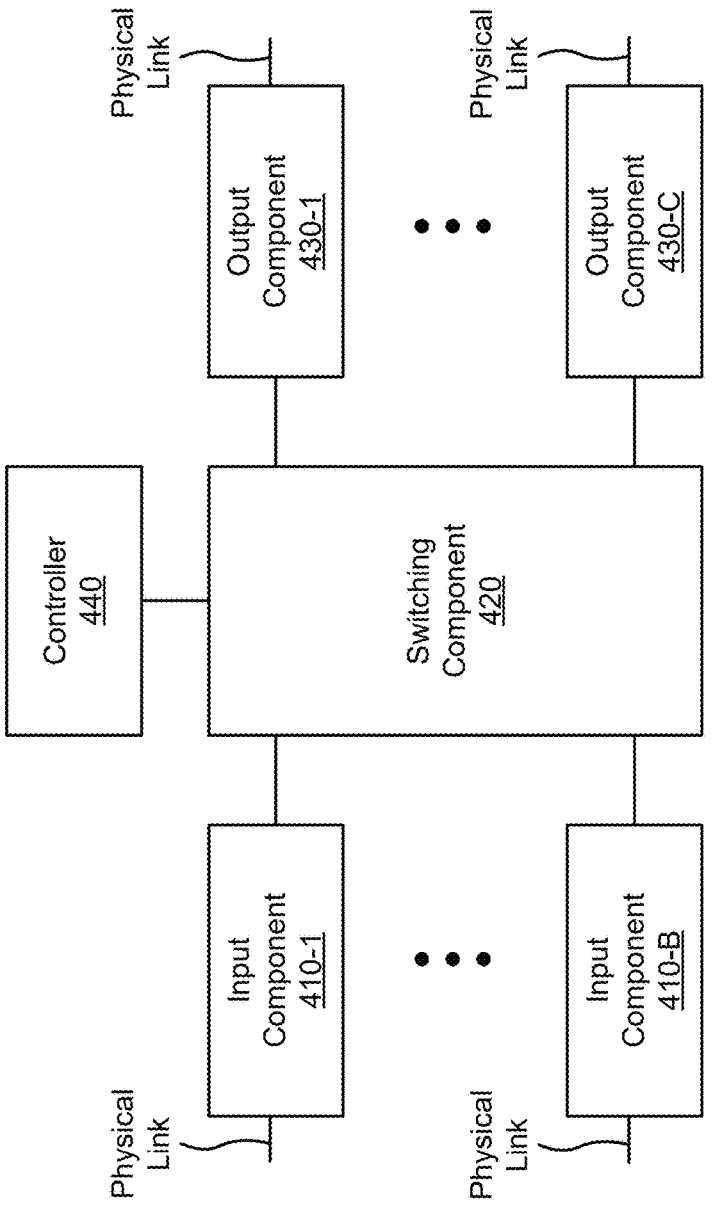

FIG. 4 is a diagram of example components of one or more devices of FIG. 2. The example components may be included in a device 400. The device 400 may correspond to the edge device 230. In some implementations, the edge device 230 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an accelerated processing unit (APU), a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for utilizing location-based repository mirrors for device upgrades. In some implementations, one or more process blocks of FIG. 5 may be performed by a device (e.g., the management system 201). In some implementations, one or more process blocks of FIG. 5 may be performed by another device or a group of devices separate from or including the device, such as an edge device (e.g., the edge device 230). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include receiving edge data identifying locations of a plurality of edge devices and other criteria associated with the plurality of edge devices (block 510). For example, the device may receive edge data identifying locations of a plurality of edge devices and other criteria associated with the plurality of edge devices, as described above. In some implementations, the plurality of edge devices includes one or more thin client devices and one or more non-thin client devices. In some implementations, the other criteria associated with the plurality of edge devices include one or more of round trip times associated with the plurality of edge devices, connection stabilities associated with the plurality of edge devices, upgrade success rates associated with the plurality of edge devices, or data privacy policies associated with the plurality of edge devices.

As further shown in FIG. 5, process 500 may include identifying an upgrade for an edge device, of the plurality of edge devices, based on the other criteria of the edge data (block 520). For example, the device may identify an upgrade for an edge device, of the plurality of edge devices, based on the other criteria of the edge data, as described above.

As further shown in FIG. 5, process 500 may include identifying a location of a repository mirror for the upgrade based on a location of the edge device identified in the edge data (block 530). For example, the device may identify a location of a repository mirror for the upgrade based on a location of the edge device identified in the edge data, as described above.

As further shown in FIG. 5, process 500 may include instructing the edge device to utilize the location of the repository mirror to receive the upgrade (block 540). For example, the device may instruct the edge device to utilize the location of the repository mirror to receive the upgrade, as described above. In some implementations, the edge device utilizes the location of the repository mirror to receive the upgrade.

In some implementations, process 500 includes removing the repository mirror after the upgrade is received by the edge device. In some implementations, process 500 includes determining a placement strategy that identifies a set of locations of repository mirrors for a set of edge devices, of the plurality of edge devices, based on the edge data. In some implementations, process 500 includes generating a minimal set of repository mirrors at the set of locations based on the placement strategy, and removing unused repository mirrors based on the placement strategy. In some implementations, process 500 includes providing a set of repository mirrors at the set of locations based on the placement strategy, providing another upgrade for the set of edge devices in the set of repository mirrors, and removing the set of repository mirrors after the other upgrade is received by the set of edge devices. In some implementations, the set of edge devices is a set of Internet of Things devices.

In some implementations, process 500 includes receiving a request for another upgrade from another edge device of the plurality of edge devices; identifying another location of another repository mirror for the other upgrade based on a location of the other edge device; providing the other repository mirror at the other location; and instructing the other edge device to utilize the other location of the other repository mirror to receive the other upgrade. In some implementations, process 500 includes removing the other repository mirror after the other upgrade is received by the other edge device.

In some implementations, process 500 includes identifying an underperforming repository mirror based on the other criteria of the edge data, and adjusting a location of the underperforming repository mirror. In some implementations, process 500 includes identifying a new upgrade for another edge device, of the plurality of edge devices, associated with an automatic upgrade schedule; identifying another location of another repository mirror for the new upgrade based on a location of the other edge device; providing the other repository mirror at the other location; and instructing the other edge device to utilize the other location of the other repository mirror to receive the new upgrade.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, edge data identifying locations of a plurality of edge devices and other criteria associated with the plurality of edge devices;
   identifying, by the device, an upgrade for an edge device, of the plurality of edge devices, based on the other criteria of the edge data;
   identifying, when the edge device is determined to be a thin device, a location of a first repository mirror for the upgrade based on comparing a location of the edge device identified in the edge data to locations associated with a plurality of repository mirrors that include the first repository mirror;
   providing, temporarily, a second repository mirror at the location of the edge device, when the edge device is a non-thin client,
      wherein the second repository mirror is provisioned with the identified upgrade, and
      wherein the second repository mirror is removed after the upgrade is received by the edge device; and
   instructing, by the device, the edge device to utilize the location of the second repository mirror to receive the upgrade.

2. The method of claim 1, further comprising: removing the second repository mirror after the upgrade is received by the edge device.

3. The method of claim 1, wherein the edge device utilizes the location of the second repository mirror to receive the upgrade, based on the device instructing the edge device.

4. The method of claim 1, further comprising: determining a placement strategy that identifies a set of locations of repository mirrors for a set of edge devices, of the plurality of edge devices, based on the edge data.

5. The method of claim 4, further comprising: generating a minimal set of repository mirrors at the set of locations based on the placement strategy; and
   removing unused repository mirrors based on the placement strategy.

6. The method of claim 4, further comprising: providing a set of repository mirrors, of the plurality of repository mirrors, at the set of locations based on the placement strategy;

providing another upgrade for the set of edge devices in the set of repository mirrors; and removing the set of repository mirrors after the other upgrade is received by the set of edge devices.

7. The method of claim 6, wherein the set of edge devices is a set of Internet of Things devices, wireless access points, routers, switches, or firewalls.

8. A device, comprising:

one or more memories; and one or more processors to:

receive edge data identifying locations of a plurality of edge devices and other criteria associated with the plurality of edge devices;

identify an upgrade for an edge device, of the plurality of edge devices, based on the other criteria of the edge data;

identify, when the edge device is determined to be a thin device, a location of a first repository mirror for the upgrade based on comparing a location of the edge device identified in the edge data to locations associated with a plurality of repository mirrors that include the first repository mirror that include the first repository mirror;

provide temporarily, a second repository mirror at the location of the edge device, when the edge device is a non-thin client, wherein the second repository mirror is provisioned with the identified upgrade, and wherein the second repository mirror is removed after the upgrade is received by the edge device;

instruct the edge device to utilize the location of the second repository mirror to receive the upgrade; and remove the second repository mirror after the upgrade is received by the edge device.

9. The device of claim 8, wherein the plurality of edge devices includes one or more thin client devices and one or more non-thin client devices.

10. The device of claim 8, wherein the one or more processors are further to:

receive a request for another upgrade from another edge device of the plurality of edge devices;

identify another location of another repository mirror for the other upgrade based on a location of the other edge device;

provide the other repository mirror at the other location; and instruct the other edge device to utilize the other location of the other repository mirror to receive the other upgrade.

11. The device of claim 10, wherein the one or more processors are further to:

remove the other repository mirror after the other upgrade is received by the other edge device.

12. The device of claim 8, wherein the other criteria associated with the plurality of edge devices includes one or more of:

round trip times associated with the plurality of edge devices, connection stabilities associated with the plurality of edge devices, upgrade success rates associated with the plurality of edge devices, or data privacy policies associated with the plurality of edge devices.

13. The device of claim 8, wherein the one or more processors are further to:

identify an underperforming repository mirror based on the other criteria of the edge data; and adjust a location of the underperforming repository mirror.

14. The device of claim 8, wherein the one or more processors are further to:

identify a new upgrade for another edge device, of the plurality of edge devices, associated with an automatic upgrade schedule;

identify another location of another repository mirror for the new upgrade based on a location of the other edge device;

provide the other repository mirror at the other location; and instruct the other edge device to utilize the other location of the other repository mirror to receive the new upgrade.

15. A non-transitory computer-readable medium storing a set of instructions, the set of instructions comprising:

one or more instructions that, when executed by one or more processors of a device, cause the device to:

receive edge data identifying locations of a plurality of edge devices and other criteria associated with the plurality of edge devices, wherein the plurality of edge devices includes one or more thin client devices and one or more non-thin client devices;

identify an upgrade for an edge device, of the plurality of edge devices, based on the other criteria of the edge data;

identify, when the edge device is determined to be a thin device, a location of a first repository mirror for the upgrade based on comparing a location of the edge device identified in the edge data to locations associated with a plurality of repository mirrors that include the first repository mirror;

provide temporarily, a second repository mirror at the location of the edge device, when the edge device is a non-thin client, wherein the second repository mirror is provisioned with the identified upgrade, and wherein the second repository mirror is removed after the upgrade is received by the edge device; and instruct the edge device to utilize the location of the second repository mirror to receive the upgrade.

16. The non-transitory computer-readable medium of claim 15, wherein the one or more instructions further cause the device to:

determine a placement strategy that identifies a set of locations of repository mirrors for a set of edge devices, of the plurality of edge devices, based on the edge data.

17. The non-transitory computer-readable medium of claim 16, wherein the one or more instructions further cause the device to:

generate a minimal set of repository mirrors at the set of locations based on the placement strategy; and remove unused repository mirrors based on the placement strategy.

18. The non-transitory computer-readable medium of claim 16, wherein the one or more instructions further cause the device to:

provide a set of repository mirrors at the set of locations based on the placement strategy;

provide another upgrade for the set of edge devices in the set of repository mirrors; and remove the set of repository mirrors after the other upgrade is received by the set of edge devices.

19. The non-transitory computer-readable medium of claim 15, wherein the one or more instructions further cause the device to:

receive a request for another upgrade from another edge device of the plurality of edge devices;

identify another location of another repository mirror for the other upgrade based on a location of the other edge device;

provide the other repository mirror at the other location;

instruct the other edge device to utilize the other location of the other repository mirror to receive the other upgrade; and remove the other repository mirror after the other upgrade is received by the other edge device.

20. The non-transitory computer-readable medium of claim 15, wherein the one or more instructions further cause the device to:

identify an underperforming repository mirror based on the other criteria of the edge data; and adjust a location of the underperforming repository mirror.

\* \* \* \* \*